J. D. O'Callahan,
Hand Plow.
No. 95,718. Patented Oct. 12. 1869.
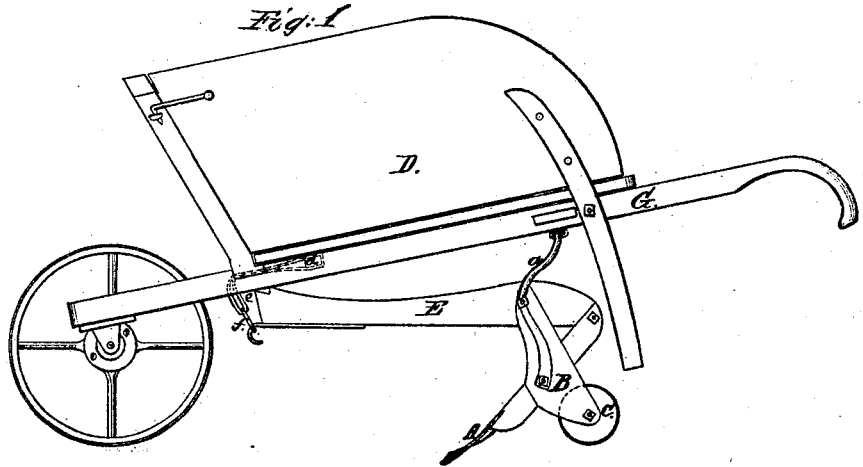
Witnesses  
Inventor  
John D. O'Callaghan  
by P. F. Wilson Atty
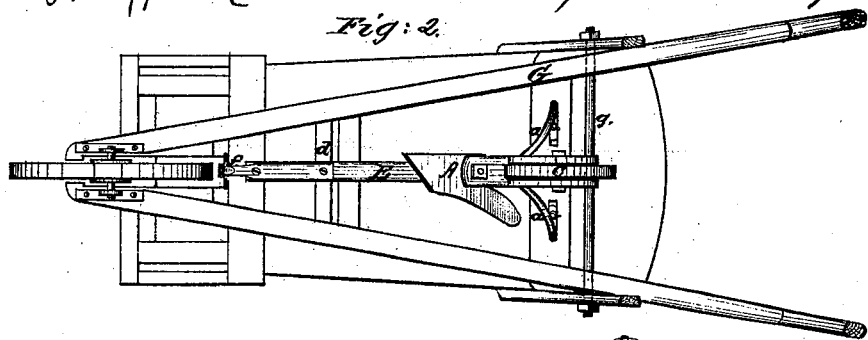
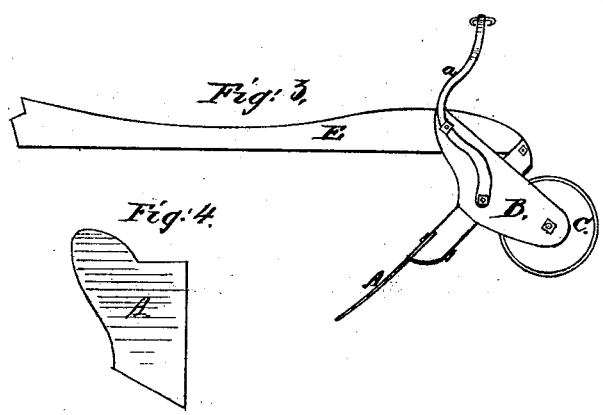

UNITED STATES PATENT OFFICE.

JOHN D. O'CALLAGHAN, OF CALHOUN, GEORGIA.

IMPROVEMENT IN COMBINED WHEELBARROW AND GARDEN-PLOW.

Specification forming part of Letters Patent No. 95,718, dated October 12, 1869.

*To all whom it may concern:*

Be it known that I, JOHN D. O'CALLAGHAN, of Calhoun, county of Gordon, and State of Georgia, have invented certain Improvements in a Wheelbarrow and Garden-Plow, of which the following is a specification.

The nature and object of the invention are to combine a wheelbarrow and garden plow or cultivator.

In the accompanying drawings, Figure 1 represents a side view of the wheelbarrow and cultivator in position for use. A represents the blade of the plow, attached to the shank of the plow by a heavy screw, which can be removed, and other blades or rakes can be adjusted for use at the pleasure of those using it. B is a wooden flange, securing the wheel C, that rests on the ground and supports the plow, which can be regulated by the wire braces (marked $a$) bolted to the flanges on each side of the wheel C, and running to the bottom of the barrow. D represents the sides of the barrow, which can be taken off by drawing a wire bolt, (marked $g$, in Fig. 2.) $d$ is a cross-piece, to which is attached a leather strap, $e$, running forward and dropping over the frame of the barrow, passing through an eyelet, $f$, to which is securely hooked the cultivator E.

Fig. 2 represents the bottom view of the wheelbarrow and cultivator.

Fig. 3 shows the cultivator detached.

Fig. 4 shows the full view of the blade, (marked A.)

Fig. 5 is the blade of a shovel-plow.

What I claim as my improvement, and desire to secure by Letters Patent, is—

1. The herein-described combination of the plow A E and wheelbarrow D G, as specified.

2. The herein-described manner of attaching the plow to the handles and frame of the barrow, by means of the cross-piece $d$, leather strap $e$, link $f$, and braces $a$ $a$, as shown and described.

This specification signed and witnessed this 8th day of September, 1869.

JOHN D. O'CALLAGHAN.

Witnesses:
Z. T. GREY,
J. D. LINSLEY.